July 29, 1952   E. H. SIELING   2,605,010
HANDLE
Filed May 7, 1948   2 SHEETS—SHEET 1
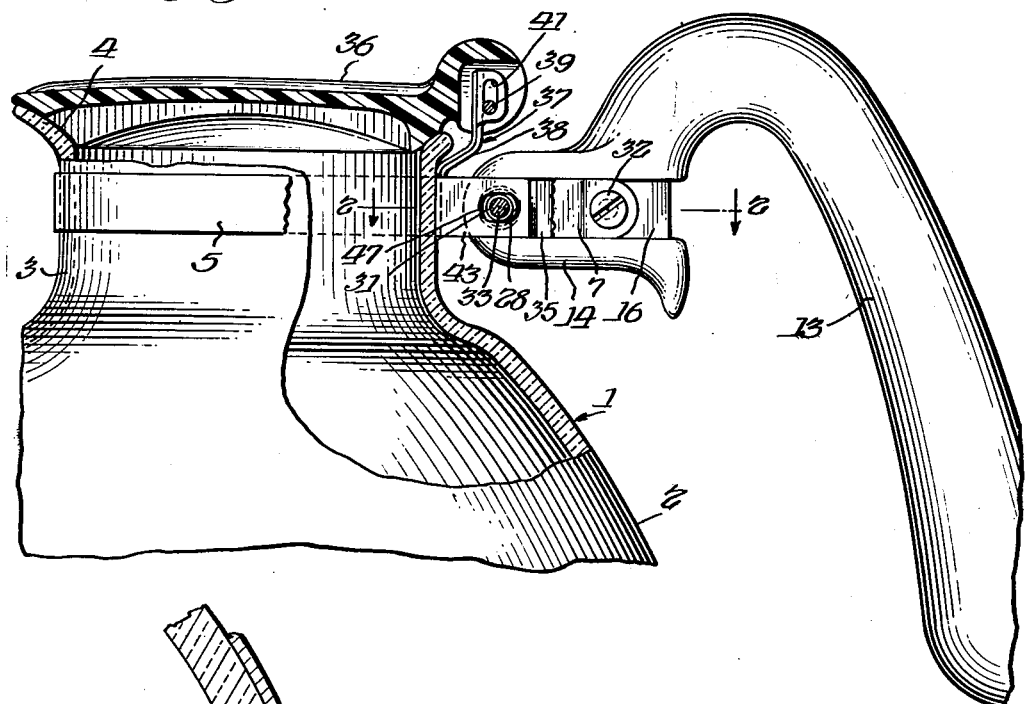
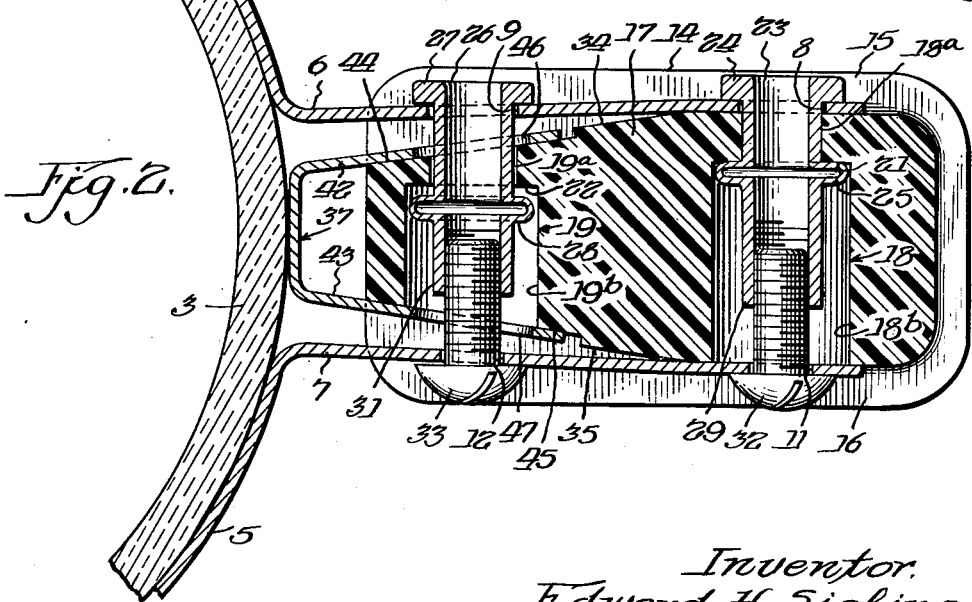
Inventor.
Edward H. Sieling.
By Lee & Lee
Attys.

July 29, 1952     E. H. SIELING     2,605,010
HANDLE
Filed May 7, 1948     2 SHEETS—SHEET 2
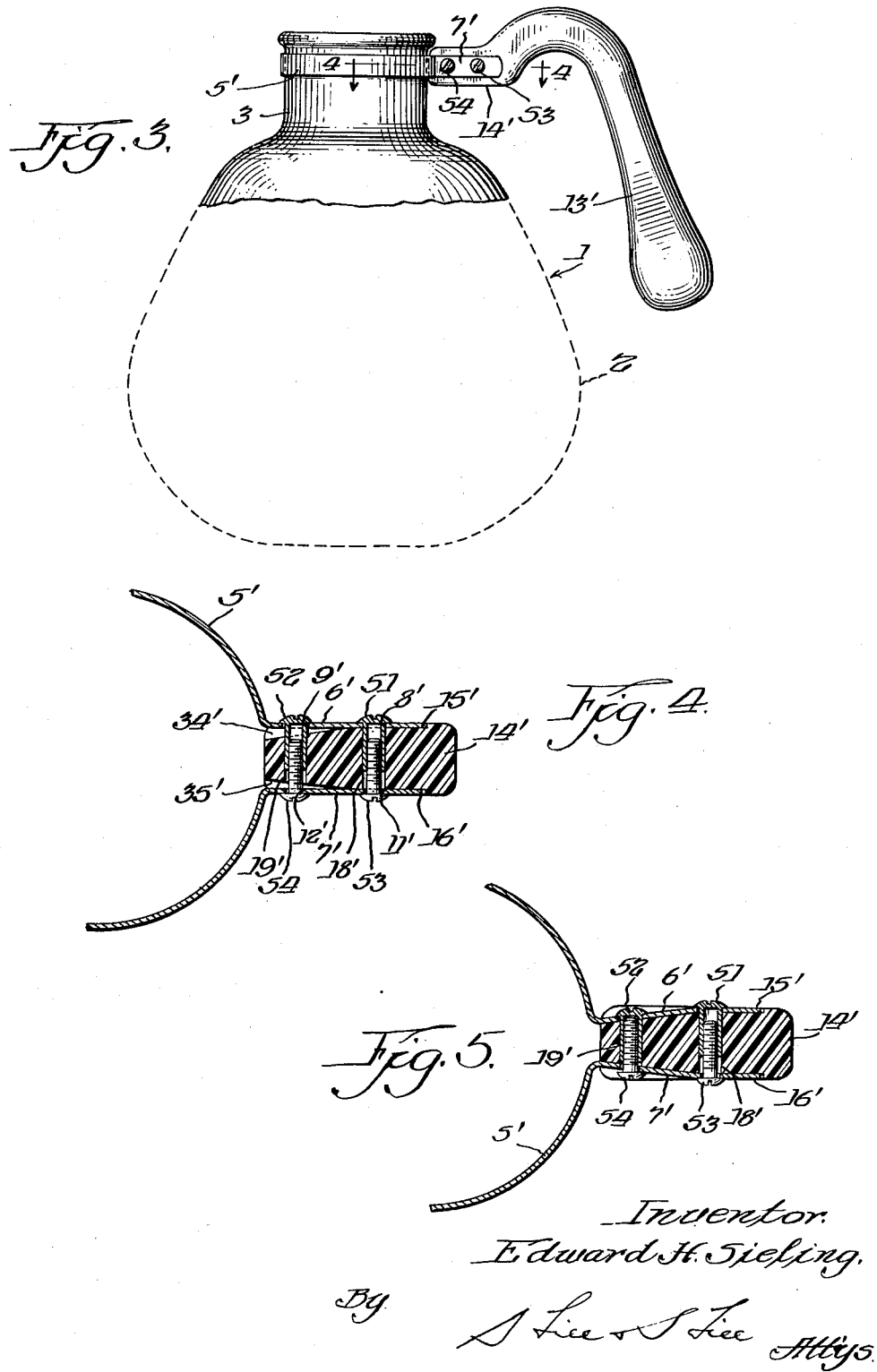
Inventor.
Edward H. Sieling.
By S. Lee & S. Lee Attys Patented July 29, 1952

2,605,010

UNITED STATES PATENT OFFICE 2,605,010

HANDLE

Edward H. Sieling, Chicago, Ill.

Application May 7, 1948, Serial No. 25,719

7 Claims. (Cl. 215—100)

The invention relates generally to handles, and more particularly to a handle adapted for use on decanters or the like such as those commonly supplied as one of the components of coffee makers.

The present invention is an improvement in handles such as that illustrated in my prior Patent No. 2,424,125, issued July 15, 1947, and has among its objects the production of a handle which may be positioned relatively close to the decanter or other article to which it is applied and at the same time provide a degree of adjustability to permit attachment of the handle to decanters or other objects which may vary slightly in diameter as well as, vessels of slightly different sizes.

Another object of the invention is the production of such a handle which may be firmly attached to a glass vessel without danger of cracking the glass.

A further object of the invention is the production of such a handle, wherein the object engaging loop and lid, if one is provided, may be permanently connected to the handle proper, thereby preventing loss of parts prior to the mounting thereof on the vessel.

Many other objects and advantages of the construction herein shown and described will be obvious to those skilled in the art from the disclosure herein given.

To this end my invention consists in the novel construction, arrangement and combination of parts herein shown and described, and more particularly pointed out in the claims.

In the drawings, wherein like reference characters indicate like or corresponding parts:

Fig. 1 is a sectional view through a portion of a decanter and handle therefor constructed in accordance with the present invention;

Fig. 2 is a sectional view taken approximately on the line 2—2 of Fig. 1;

Fig. 3 is an elevational view of a modified form of the handle embodying the present invention but without the lid or cover;

Fig. 4 is a sectional view taken approximately on the line 4—4 of Fig. 3; and

Fig. 5 is a sectional view similar to Fig. 4 illustrating the adjustability of the parts.

Referring to the drawings, and particularly to Figs. 1 and 2 which illustrate one embodiment of the invention, 1 indicates generally a glass decanter or the like having a bowl portion 2 (partially shown) terminating in its upper end in a neck portion 3, formed with a mouth 4 through which the contents of the decanter may be dispensed.

Extending partially around the neck 3 is an open loop 5 formed from a single strip of material and with the free ends extended to form a pair of more or less spaced parallelly extending legs 6 and 7, the leg 6 having a pair of spaced apertures 8 and 9 therein, and the leg 7 having a corresponding pair of apertures 11 and 12 therein aligned with the apertures 8 and 9 respectively.

The handle 13 constructed of any suitable material, preferably of low heat conductivity, is provided with an extension 14, the side walls of which are each provided with a groove or channel 15 and 16, the heights of the respective channels being approximately equal to the width of the legs 6 and 7 of the band 5, whereby the legs may be snugly positioned in the channels 15 and 16 to prevent relative rotation between the handle and legs. The intermediate portion 17 of the extension 14 positioned between the legs 6 and 7 is provided with a pair of bores indicated generally by the numerals 18 and 19 respectively, the bore 18 being aligned with the apertures 8 and 11 and the bore 19 aligned with the apertures 9 and 12 in the respective legs. Referring to Fig. 2, it will be noted that the portion 18a of the bore 18 and the portion 19a of the bore 19, positioned adjacent the leg 6, are of relatively small diameter; whereas, the portions 18b and 19b of the respective bores adjacent the leg 7 are of relatively large diameter, thereby forming an internal shoulder 21 in the bore 18 and a similar shoulder 22 in the bore 19.

Extending through the aperture 8 in the leg 6 and the bore 18 is a hollow rivet 23 having a head 24 bearing on the leg 6 and upset as indicated at 25 against the shoulder 21, thereby firmly clamping the leg 6 to the portion 17 of the extension. Extending through the aperture 9 and bore 19 is a similar hollow rivet 26 having a head 27 bearing on the leg 6 and upset as indicated at 28. It will be noted, however, that the portion 19a of the bore 19 is slightly larger in diameter than that of the rivet and that the upset portion 28 of the rivet 26 is spaced from the shoulder 22 so that the rivet 26 may axially move in the bore 19. It will be noted that with this construction the band 5 is substantially permanently attached by means of the leg 6 and rivets 23 and 26 to the handle. The free end portions 29 and 31 of the rivets 23 and 26 respectively are internally threaded and adapted to receive screws 32 and 33 passing through the apertures 11 and 12 respectively in the leg 7. Thus, by tightly drawing down the screw 32 the leg 7 may also be secured to the portion 17 of the extension 14.

Referring to Fig. 2 it will be noted that the side walls 34 and 35 of the portion 17, adjacent the bore 19, are cut away inwardly so that they are spaced from the portions of the legs 6 and 7 opposite the bore 19, whereby the legs 6 and 7 may be drawn towards one another by tightening the screw 33, the converging walls 34 and 35 permitting a considerable movement of the legs 6 and 7 towards one another to thus reduce the diameter of the loop formed by the band 5, whereby the latter may be snugly tightened down on the neck 3 of the decanter and sufficient adjustability is provided to accommodate vessels of slightly different sizes as well as to compensate for minor variations in vessels of the same size.

As illustrated in Fig. 1, associated with the handle 13, if desired, may be a lid or cover 36 pivotally connected to a bracket indicated generally by the numeral 37, the latter, in the present instance, being illustrated as comprising an upwardly extending portion 38 to which the lid 36 is pivotally connected by means of a pin 39 passing through slots or apertures 41 in the upper portion of the bracket. The bracket 37 is attached to the extension 14 of the handle by means of a pair of arms 42 and 43 integrally formed with the bracket 37 and shaped to engage the walls 34 and 35 which may be recessed as indicated at 44 and 45 to receive the same, with the arms 42 and 43 diverging to conform substantially to the side walls 34 and 35. The arms 42 and 43 are provided with elongated apertures 46 and 47 respectively, through which the rivet 26 and screw 33 extend. The elongation in the apertures 46 and 47 permits an adjustment of the bracket 37 and lid 36 with respect to the mouth of the vessel, whereby the lid may be centered with respect to the mouth.

It will be noted that with this construction, the extension 14 of the handle is positioned relatively close to the neck 3 of the decanter or vessel as distinguished from my previous construction disclosed in the patent heretofore referred to, wherein the handle was spaced a greater distance from the neck of the decanter.

The construction illustrated in Figs. 3, 4 and 5 is similar to that heretofore described with the exception that the lid and mounting bracket therefor are omitted and male and female screws are substituted for the attaching rivets. Referring to Figs. 3, 4 and 5, 5' designates a band adapted to encircle the neck 3 of the decanter, the band terminating in more or less parallelly extending legs 6' and 7' having spaced apertures 8', 9', 11' and 12' therein. The extension 14' of the handle 13' is provided with channels or grooves 15' and 16' corresponding to the channels 15 and 16 illustrated in Figs. 1 and 2, and the inner end of the extension 14' adjacent the looped portion of the band 5 is cut away inwardly as indicated at 34' and 35'. The extension 14' is likewise provided with a pair of bores 18' and 19' aligned with the apertures 8' and 11' and 9' and 12' respectively.

Extending through the apertures 8' and 9' and into the bores 18' and 19' are internally threaded female screws 51 and 52 respectively adapted to be engaged by male screws 53 and 54 respectively, whereby the free ends of the legs 6' and 7' may be firmly secured to the extension 14' by the male and female screws 53 and 51. Likewise, the loop formed by the band 5' may be drawn firmly about the neck 3 of the vessel or decanter by means of the male and female screws 54 and 52 and, as illustrated in Fig. 4, it will be noted that the diameter of the loop may be reduced by tightly drawing the screws 52 and 54 together, thereby flexing the legs 6' and 7' to the position illustrated in Fig. 5.

As in the construction disclosed in Figs. 1 and 2, the side walls of the channels 15' and 16' snugly engage the upper and lower edges of the legs 6' and 7', thereby preventing relative rotational movement of the handle with respect to the band 5, and that the legs 6' and 7' are rigidly attached to the handle while suitable adjustment is provided by the screws 52 and 54.

It will be noted from the above description that I have provided a handle construction, wherein the handle may be closely positioned with respect to the neck of the decanter or vessel upon which it is attached and yet provide satisfactory adjustment for accommodating vessels of slightly different sizes, and which, if desired, may be provided to support a lid structure. Likewise, suitable means may be provided for permanently attaching the band to the handle portion so that the only loose parts are the two attaching screws. Obviously, if desired, a suitable cover band or the like may be placed around the exposed ends of the legs 6' and 7' to conceal the attaching screws or rivets as is well understood by one skilled in the prior art.

Having thus described my invention, it is obvious that various immaterial modifications may be made in the same without departing from the spirit of my invention; hence, I do not wish to be understood as limiting myself to the exact form, construction, arrangement and combination of parts herein shown and described or uses mentioned.

What I claim as new and desire to secure by Letters Patent is:

1. In a handle, the combination of an object engaging member having two flexible legs, a handle grip having an extension disposed between the end portions of said legs and engaging the top and bottom edges thereof, said extension shaped to provide a reduced portion, fastening means passing through said extension and said legs adjacent the free ends thereof for firmly clamping said legs to said extension, and adjustable fastening means connecting said legs at a point intermediate said first fastening means and the inner end of said extension, the latter being less in width adjacent said second fastening means than adjacent the first fastening means to form the reduced portion and permitting said legs to flex inwardly upon tightening of said second fastening means, with the distance between said legs adjacent the latter means being less than the distance between said legs at said first fastening means.

2. In a handle for decanters, the combination of an open loop adapted to partially surround the neck of a decanter and terminating in two flexible legs, a handle grip having an extension disposed between the end portions of said legs and engaging the top and bottom edges thereof, fastening means passing through said extension and said legs adjacent the free ends thereof for firmly clamping said legs to said extension and to maintain a fixed distance between said ends, and adjustable fastening means connecting said legs at a point intermediate said first fastening means and the inner end of said extension, the latter being recessed on opposite sides adjacent said second fastening means the inner faces of said recess tapering inwardly toward the inner end of said extension to permit said legs to flex inwardly upon tightening of said second fastening means, with the distance between said legs adjacent said loop being less than the fixed distance between the free ends of said legs.

3. In a handle, the combination of an object engaging member having a loop terminating in two flexible legs, a handle grip having an extension disposed between the end portions of said legs, said extension shaped to provide a reduced portion substantially wider at the outer end of the extension than the inner end thereof permitting an adjustment of the circumference of the loop, fastening means passing through said extension and said legs adjacent the free ends thereof for firmly clamping said legs to said extension, and adjustable fastening means connecting said legs at a point intermediate said first fastening means and the inner end of said extension, the latter being less in thickness adjacent said second fastening means than adjacent said first fastening means to permit said legs to flex inwardly upon tightening of said second fastening means, to provide an adjustment of the effective circumference of said loop approximately within the limits of the difference in thickness of said extension at the respective fastening means.

4. In a handle for decanters, the combination of an open loop adapted to partially surround the neck of a decanter and terminating in two flexible legs having end portions, said end portions each having a pair of spaced apertures therein, a handle grip having an extension disposed between the end portions of said legs, said extension having longitudinally extending channels in the side walls thereof of a size to receive said end portions, with the longitudinal edges of said end portions engaging the side walls of the respective channels, said extension having a pair of spaced bores therein aligned with apertures in the respective end portions, the size of said bores being greater at one side of the extension than at the other to form an internal shoulder in each bore, an internally threaded rivet positioned in the bore adjacent the free ends of said legs and passing through the aligned aperture in the leg adjacent the small portion of said bore, said rivet having a deformed portion seated on the internal shoulder in such bore and a head engaging such leg to secure the latter to said extension, an internally threaded rivet positioned in the other bore and the other aperture in said leg, said rivet having a deformed portion adjacent the internal shoulder bore and a head adjacent such leg, said rivet being axially movable in said bore, and screws passing through the respective apertures in the other leg and threaded into respective rivets.

5. In a handle for decanters, the combination of an open loop adapted to partially surround the neck of a decanter and terminating in two flexible legs having end portions, said end portions each having a pair of spaced apertures therein, a handle grip having an extension disposed between the end portions of said legs, said extension having longitudinally extending channels in the side walls thereof of a size to receive said end portions, with the longitudinal edges of said end portions engaging the side walls of the respective channels, said extension having a pair of spaced bores therein aligned with apertures in the respective end portions, the size of said bores being greater at one side of the extension than at the other to form an internal shoulder in each bore, an internally threaded hollow rivet positioned in the bore adjacent the free ends of said legs passing through the aligned aperture in the leg adjacent the small portion of said bore and having an annular shoulder bearing against said internal shoulder and a head bearing against the outer face of said leg to secure the latter to said extension, an internally threaded hollow rivet positioned in the other bore and the other aperture in said leg, said rivet having an annular shoulder adjacent the internal shoulder in such bore and a head adjacent such leg, said rivet being axially movable in said bore, and screws passing through the respective apertures in the other leg and threaded into respective rivets.

6. In a handle for decanters, the combination of an open loop adapted to partially surround the neck of a decanter and terminating in two flexible legs having end portions, said end portions each having a pair of spaced apertures therein, a handle grip having an extension disposed between the end portions of said legs, said extension having longitudinally extending channels in the side walls thereof of a size to receive said end portions, with the longitudinal edges of said end portions engaging the side walls of the respective channels, the bottom of said channels converging toward the neck of the decanter, said extension having a pair of spaced bores therein aligned with apertures in the respective end portions, the size of said bores being greater at one side of the extension than at the other to form an internal shoulder in each bore, an internally threaded hollow rivet positioned in the bore adjacent the free ends of said legs passing through the aligned aperture in the leg adjacent the small portion of said bore and having an annular shoulder bearing against said internal shoulder and a head bearing against the outer face of the latter to secure the same to said extension, an internally threaded hollow rivet positioned in the other bore and the other aperture in said leg, said rivet having an annular shoulder adjacent the internal shoulder in such bore and a head adjacent the outer face of such leg, said rivet being axially movable in said bore, and screws passing through the respective apertures in the other leg and threaded into respective rivets.

7. In a handle and lid structure, for decanters, the combination of an open loop adapted to partially surround the neck of a decanter and terminating in two flexible legs having end portions, said end portions each having a pair of spaced apertures therein, a handle grip having an extension disposed between the end portions of said legs, said extension having longitudinally extending channels in the side walls thereof of a size to receive said end portions, with the longitudinal edges of said end portions engaging the side walls of the respective channels, a lid member, a bracket pivotally connected to said lid, said bracket having a pair of spaced arms, each arm having an aperture therein and positioned between one of said legs and said extension, the latter having a pair of spaced bores therein aligned with apertures in the respective end portions, the size of said bores being greater at one side of the extension than at the other to form an internal shoulder in each bore, an internally threaded rivet positioned in the bore adjacent the free ends of said legs passing through the aligned aperture in the leg adjacent the small portion of said bore, said rivet having a deformed portion seated on the internal shoulder in such bore, and a head engaging such leg to secure the latter to said extension, an internally threaded rivet positioned in the other bore and passing through the aperture in the adjacent arm of said bracket and the other aperture in said leg, said rivet having a deformed portion adjacent the internal shoulder in such bore and a head adjacent such leg, said rivet being axially movable in said bore, and a pair of screws one of which passes through the aligned apertures in the other leg and arm, and the other screw passing through the other aperture in such leg, said screws being threaded into the respective rivets.

EDWARD H. SIELING.

REFERENCES CITED

The following references are of record in the file of this patent:

UNITED STATES PATENTS

| Number | Name | Date |
|---|---|---|
| 2,359,189 | Alsdorf | Sept. 26, 1944 |
| 2,422,510 | Ward | June 17, 1947 |
| 2,424,125 | Sieling | July 15, 1947 |
| 2,434,122 | Reichold | Jan. 6, 1948 |